UNITED STATES PATENT OFFICE.

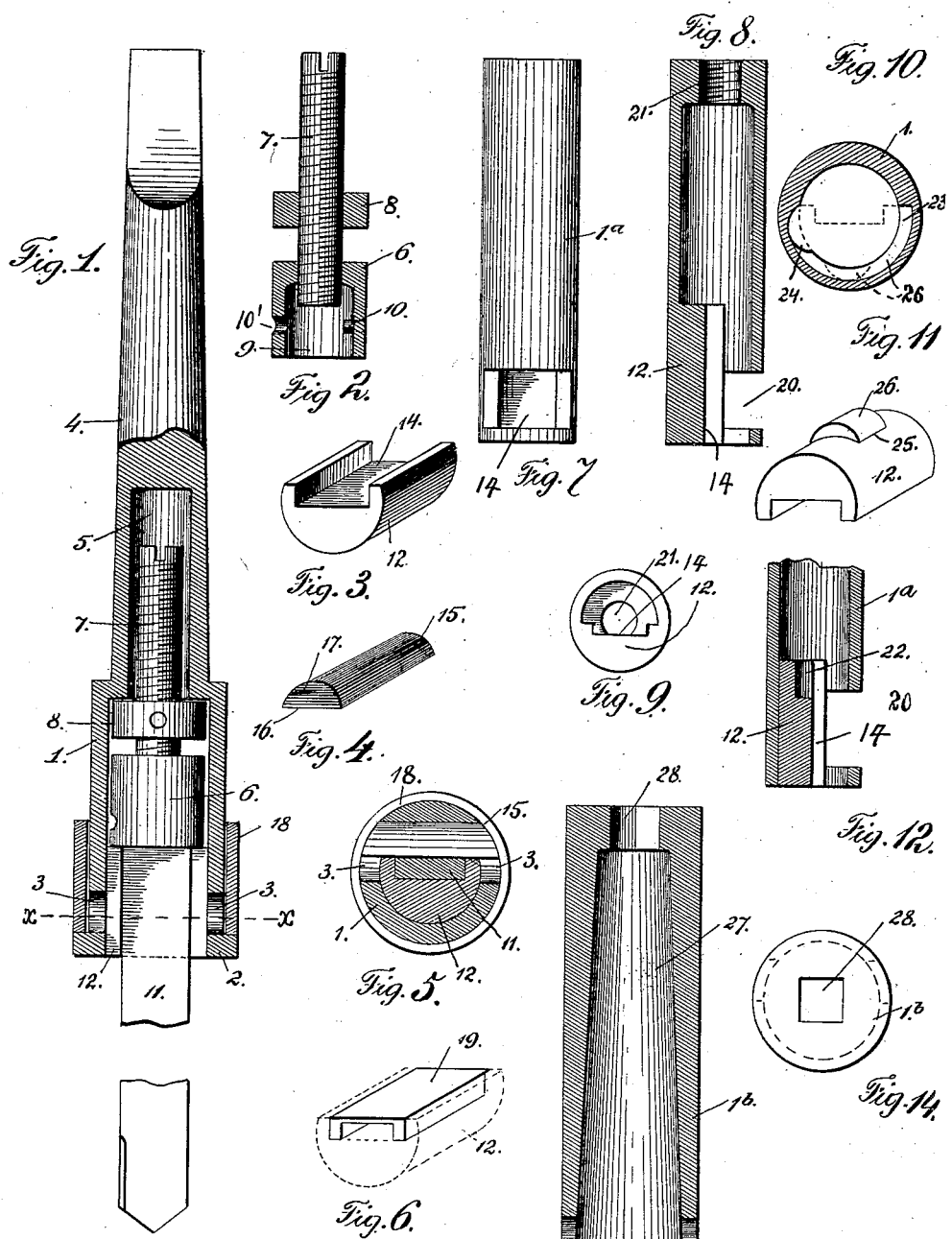

JAMES MARSTON, OF BRADDOCK, PENNSYLVANIA.

DRILL AND BIT HOLDER FOR BORING-MACHINES.

No. 886,228.     Specification of Letters Patent.     Patented April 28, 1908.

Application filed March 8, 1907. Serial No. 361,383.

*To all whom it may concern:*

Be it known that I, JAMES MARSTON, a citizen of the United States of America, residing at Braddock, in the county of Allegheny and State of Pennsylvania, have invented certain new and useful Improvements in Drill and Bit Holders for Boring-Machines, of which the following is a specification, reference being had therein to the accompanying drawing.

This invention relates to drill and bit holders for boring machines, and the invention has for its object to provide a novel holder or chuck for firmly holding the drill or bit, whereby it cannot become detached during the operation of the machine.

Another object of this invention is to provied a simple and inexpensive holder or chuck wherein positive and reliable means are employed for properly positioning and retaining a drill or bit within the holder or chuck.

A further object of this invention is to provide a holder or chuck for drills and bits wherein novel means is employed for preventing a drill or bit from rotating in its holder or chuck.

With the above and other objects in view, which will more readily appear as the invention is better understood, the same consists in the novel construction, combination and arrangement of parts to be hereinafter more fully described and then specifically pointed out in the appended claims.

Referring to the drawing forming part of this specification, like numerals of reference designate corresponding parts throughout the several views, in which:—

Figure 1 is a vertical sectional view of a holder or chuck constructed in accordance with my invention, Fig. 2 is a vertical sectional view of an adjustable head used in connection with the holder or chuck, Fig. 3 is a perspective view of a drill or bit block, Fig. 4 is a perspective view of a block key, Fig. 5 is a cross sectional view taken on the line x—x of Fig. 1, Fig. 6 is a perspective view of an auxiliary plate used in connection with the drill or bit block for holding drills or bits of a small size, Fig. 7 is a front elevation of a modified form of holder or chuck, Fig. 8 is a vertical sectional view of the same, Fig. 9 is an end view of the same, Fig. 10 is a cross sectional view of another modified form of holder or chuck, Fig. 11 is a perspective view of a drill or bit block used in connection with the modified form illustrated in Fig. 10 of the drawing, Fig. 12 is a fragmentary perspective view of still another modified form of holder or chuck, Fig. 13 is a vertical sectional view of still another modified form of holder or chuck, Fig. 14 is a plan of the same.

To put my invention into practice, I construct my improved drill and bit holder or chuck of a cylindrical body portion 1 having a flanged end 2 and diametrically opposed openings 3, said openings being located at the flanged end of the body portion 1. The opposite end of the body portion 1 terminates in a Morse taper or shank 4 having a bore 5 communicating with the interior of the body portion 1.

Adapted to fit in the cylindrical body portion 1 is an adjustable head 6, said head being carried by a screw 7 upon which is mounted for rotation a nut 8. The head 6 is recessed, as at 9, and provided with an inwardly extending lug or pin 10. The head 6 is adapted to receive the end of the shank of a drill or bit 11, said drill or bit being rectangular in cross section, and said head is prevented from rotating upon said drill end by the pin or lug 10. The shank of the drill or bit 11 is supported within a block 12 placed within the cylindrical body portion 1, said block being substantially semi-cylindrical and provided with a channel 14 to receive the shank of the drill or bit 11.

It is to be understood that the lower end of the screw 7 contacts with the end of the drill 11 to limit the insertion of the latter within the body portion 1 and the adjustable head 6 limits the insertion at the desired point of the block 12 within said body portion.

After the nut 8 has been properly positioned upon the screw 7 to hold the head 6 at the desired place within the cylindrical body portion 1, and the end of the shank of the drill or bit placed in the head 6 and in the channel 14 of the block 12, a semi-cylindrical block key 15 is placed in the openings 3 transversely of the drill or bit 11 and the block 12, the flat side 16 of the key resting upon the flat side of the shank of the drill or bit. The key 15 is slightly tapered and is provided with beveled ends 17, whereby after the key has been placed in the openings 3, a sleeve 18 can be placed over the cylindrical body portion 1 to rest upon the flanged end 2 thereof, and prevent the key from becoming disengaged from the holder or chuck, while the same is being used. The small opening 10' is provided in the casing for the purpose of positioning the pin 10 within the head 5 during the manufacture of the device.

In Fig. 6 of the drawings, a slight modification of my invention is illustrated wherein I employ an auxiliary plate 19 in connection with the drill or bit block 12, the latter being shown in dotted lines. The auxiliary plate 19 is employed where the drill or bit is of a less cross sectional area than the drill or bit illustrated in Fig. 1 of the drawing, thus permitting of smaller drills or bits being readily clamped within my improved holder or chuck.

Reference will now be had to Figs. 7 to 9 inclusive, wherein another modification of my invention is illustrated, the modification consisting of providing a cylindrical body portion 1$^a$ with an integral drill or bit block 12 and instead of employing the openings 3 to permit of the key 15 being placed in the cylindrical body portion, I simply cut away the cylindrical body portion 1$^a$, as at 20. Instead of using the nuts 8 to properly position the screw 7 within the cylindrical body portion, I provide the end of the body portion 1$^a$ with a threaded opening 21, in which the screw 7 is adjustably mounted. Said screw 7 projects into the hollow interior of said body and engages the drill end to limit the entrance of the latter at any desired length.

A slight modification of the above construction is illustrated in Fig. 12 wherein the block 12 is loosely mounted within the cylindrical body portion 1$^a$, and is cut away, as at 22, to accommodate the lower end of the screw 7, which screw positions the drill as in the forms previously described.

In Figs. 10 and 11 of the drawings, I illustrate a still further modification of my invention wherein the cylindrical body portion 1 is provided with an interiorly arranged groove 23 communicating by a longitudinally disposed groove 24, with the outer open end of said cylinder, said groove 24 being indicated by dotted lines. The block 12 is cutaway, as at 25, to receive a segment-shaped block 26 the latter fitting in the groove 24 when the block 12 is placed in the cylindrical body portion 1 and is forcibly entered therein until said segment shaped block 26 enters the groove 23, at which time the block is partly rotated to lock the segment-shaped block 26 within the groove 23 and prevent the block 12 from being longitudinally displaced within the cylindrical body portion 1. The position of the inserted block 12, firmly locked by the segment shaped block 26 in groove 23 is clearly shown by dotted lines in Fig. 10.

It is a well known fact that some drills or bits are provided with tapering shanks which have a tang rectangular in cross section, therefore I have devised a cylindrical body portion 1$^b$ having a tapering bore 27 terminating in a rectangular opening 28, the latter receiving the end of a drill or bit adapted to be located in the cylindrical body portion 1$^b$.

From the foregoing description, it will be observed that I have devised a novel holder or chuck for drills and bits wherein simple and quickly manipulated means is employed for holding the shank of a drill or bit, whereby the same cannot rotate or become disengaged during the operation of the holder or chuck.

The numerous modifications of my invention have simply been devised as mechanical expedients where drills or bits of various forms are to be used.

The holder or chuck is constructed of strong and durable metal and I desire it to be understood that such changes in the size, proportion and minor details of construction, as are permissible by the appended claims, may be resorted to without departing from the spirit and scope of the invention.

What I claim and desire to secure by Letters Patent, is:—

A holder for drills consisting of a hollow cylindrical body portion having a shank and a flanged end, said cylindrical body portion having diametrically opposed openings formed therein, a drill holding block having a longitudinal channel and mounted in said cylindrical body portion, a key mounted in the openings of said body portion transversely of said block, and a sleeve adapted to fit down over said cylindrical body portion, and key and rest upon said flange.

In testimony whereof I affix my signature in the presence of two witnesses.

JAMES MARSTON.

Witnesses:
    MAX H. SROLOVITZ,
    A. J. TRIGG.